F. A. AYRES.
EDUCATIONAL FILM.
APPLICATION FILED NOV. 7, 1918.

1,385,354.

Patented July 26, 1921.
2 SHEETS—SHEET 1.

F. A. Ayres Inventor

By Lancaster Allwine
Attorneys

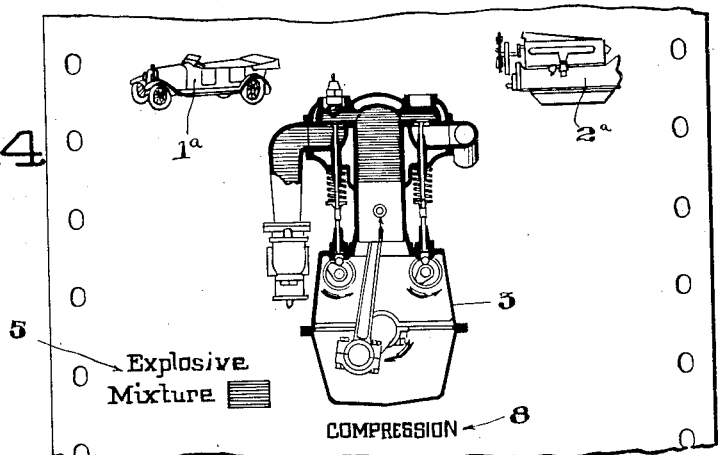
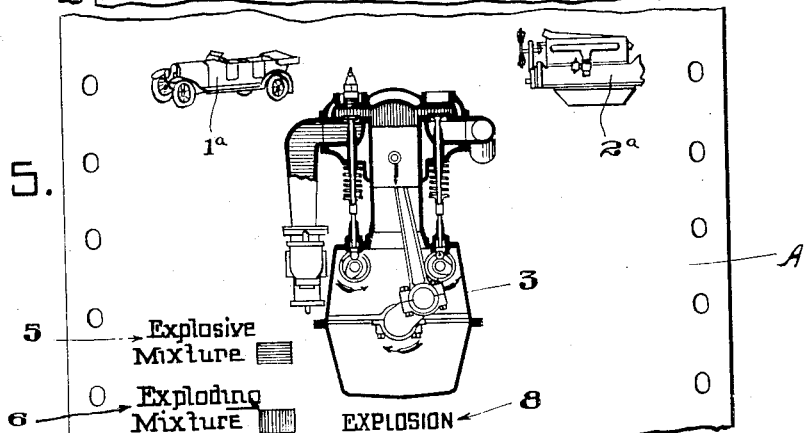
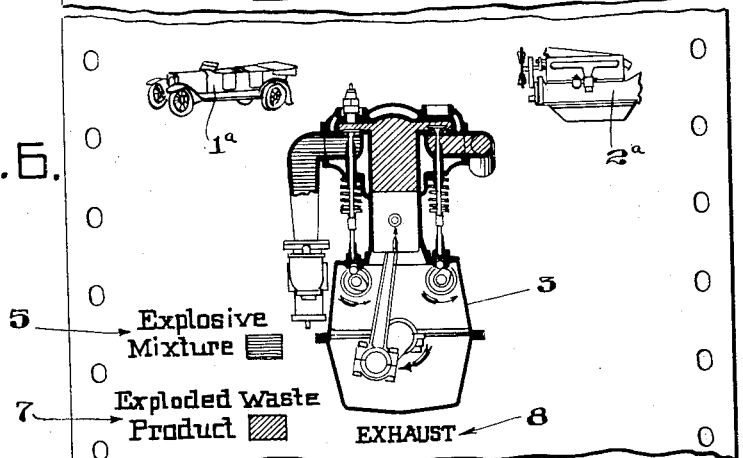

UNITED STATES PATENT OFFICE.

FREDRICK A. AYRES, OF STERLING, COLORADO.

EDUCATIONAL FILM.

1,385,354.   Specification of Letters Patent.   Patented July 26, 1921.

Application filed November 7, 1918. Serial No. 261,513.

*To all whom it may concern:*

Be it known that I, FREDRICK A. AYRES, a citizen of the United States, residing at Sterling, in the county of Logan and State of Colorado, have invented certain new and useful Improvements in Educational Films, of which the following is a specification.

This invention relates to motion picture films of the educational type, and an object of the invention is to provide a film for producing upon a screen, a reproduction of a machine or appliance, for the purpose of explaining or illustrating comprehensively the operation of the said machine or appliance.

Another general object of the invention is to provide an educational film suitable for use in standard types of motion picture projectors for displaying a series of apparently animated pictures which consecutively display a machine or appliance in its different phases of operation; and more specifically to provide a film in which the initial views will show the complete machine or appliance to be considered in operation, this being followed by the removal of the picture of the device from the normal view but still displaying the same in one corner of the film so that the audience may keep in mind the machine or appliance under consideration, the said display serving as a key to the subsequent views being displayed, so that if a spectator should arrive late, he could still gain some understanding of the pictures being projected, especially in cases where the pictures subsequent to the initial display illustrated sections through or only parts of the device to more comprehensively bring out the desired details of the construction and operation of the machine or appliance under consideration.

Another object of the invention is to employ a color scheme in a film to demonstrate the cause and effect of power in force to move parts of the machinery or appliance, such as machines employing fluid, either liquid or gaseous, which fluid is in motion and changes its density or other condition, said conditions of the fluid being represented by different colors or the grading of the colors, and to associate with such pictures a key in one corner of the film, embodying suitable indicia to acquaint the audience of the meaning of the various colors appearing in the pictures. If it is desired, the key may embody indicia referring only to those colors appearing in the picture displayed for the time being, so as not to confuse the audience with numerous irrelevant colors or indicia.

Further objects will appear hereafter, and will be in part understood and in part disclosed in the following detailed description of the specific application of the educational film, wherein the prime mover or engine of an automobile is illustrated employing different colors to illustrate the different conditions of the fuel employed for operating the engine, and while this particular type of machine has been utilized as an example, it is to be understood that the invention is not to be limited to the illustration of any particular machine, appliance, or type of machine.

In the drawings, which illustrate portions of a film, Figure 1 shows the initial portion of the film upon which the complete machine is shown.

Fig. 2 illustrates a portion of the film which immediately follows that portion carrying the complete machine, and it illustrates the complete motor or engine of the automobile, in the main portion of the film, while the complete automobile is moved to the upper left-hand corner of the film to serve as a key for the subsequent illustration.

Fig. 3 illustrates the portion of the film immediately following that portion illustrated in Fig. 2, and it shows a section through the engine or motor to more distinctly set forth the operation of the parts thereof, utilizing the automobile, in the upper left hand corner, the side elevation of the complete engine in the upper right corner, which serves as keys of the machine under consideration, while the key in the lower left-hand corner of the film embodies suitable indicia to acquaint an audience of the meaning of the colors employed in the film.

Fig. 4 is a portion of the film similar to Fig. 3 illustrating the engine parts in a position assumed subsequent to the condition illustrated in Fig. 3, and still maintaining the several key features.

Fig. 5 is a view of the film illustrating the portion thereof following that portion illustrated in Fig. 4, and showing the engine parts in still other positions assumed during the operation of the engine, and Fig. 6, illustrates a still further development of the parts in the operation of the engine.

The body A of the film is constructed of suitable translucent material, as is ordinary in the construction of films used for the projection of moving pictures, and it is shaped for use in connection with any standard or approved type of projecting apparatus.

Figure 1:
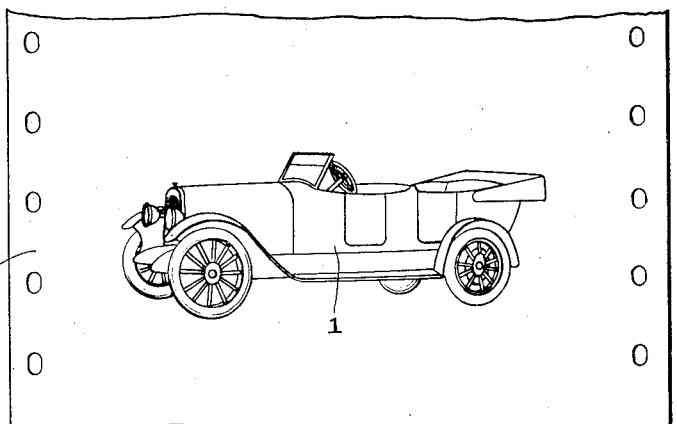

The section or portion of the film, illustrated in Fig. 1 of the drawings is preferably the portion of the film initially exhibited, and it carries thereon the representation of an automobile, indicated by the reference character 1 which conveys the idea to the audience, that the film will deal with the operation of an automobile and the next portion of the film exhibited carries the indication 2 which discloses the complete motor of the automobile, and if it is desired, a continued length of this portion of the film may be provided to give the impression that the motor is operated. It will be noted, that in this portion of the film, the representation of the automobile which is indicated by 1^A is moved to the upper left hand corner of the film and is materially reduced in size, being a miniature reproduction of the illustration upon the initial portion of the film. This illustration will disclose the idea that the film will exhibit the motor of an automobile or in other words set forth that the subsequent portions of the film will deal with the operation of the motor or engine of an ordinary pleasure automobile.

Figure 3:
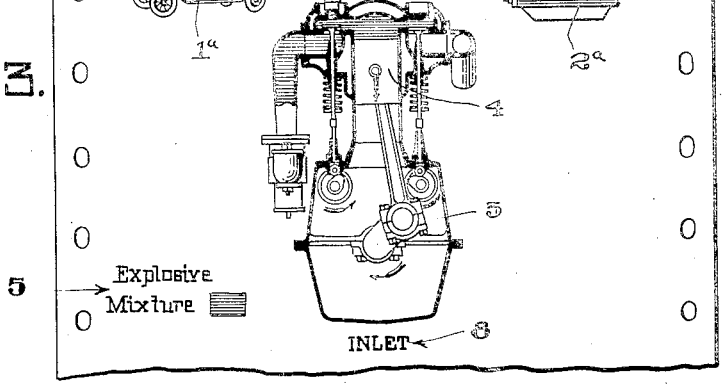

The portions of the film illustrated in Figs. 3, 4, 5 and 6 show sections through the engine, and show the successive changes in the operation of the engine, such as position of the various parts during the inlet, compression, explosion and exhaust strokes of the piston. In Fig. 3, the motor 2 is shown in cross-section, the said illustration being indicated by the numeral 3, and in this illustration the piston 4 of the engine is shown in its position assumed during the inlet of the explosive mixture into the cylinder of the engine, the said explosive mixture being shown passing from the inlet manifold through the inlet valve and into the head of the cylinder. It will be noted that the explosive mixture is shown by a predetermined color, such as blue and a key 5 is provided in the lower left-hand corner of this portion of the film which embodies suitable indicia to acquaint the audience of the meaning of the blue coloring in the pictures; and the portions of the film, which are adjacent to this portion as illustrated in Fig. 3, should deal with the successive stages of the inlet operation of the engine, showing how the fuel enters the cylinder of the engine and the manner in which the various parts thereof operate to permit the entrance of the explosive mixture or fuel into the cylinder. The portion of the film which is exhibited directly after that portion which deals with the inlet of the fuel or explosive mixture into the engine, illustrates the compression stroke of the engine as shown in Fig. 4 of the drawings, and since the explosive mixture maintains substantially the same density during this operation of the engine, as during that operation illustrated in Fig. 3, the coloring is the same, and the key 5 is also employed on this portion or section of the film.

The portion of the film which deals with the explosion operation of the engine and is illustrated in Fig. 5 carries indicia keys 5 and 6, which latter key describes the color shown in the head of the cylinder of the engine which indicates the exploding mixture, while the explosive mixture which is illustrated in the manifold of the engine still maintains the same condition as the explosive mixture illustrated in Figs. 3 and 4 and consequently it is necessary to continue the key 5 and to provide the new key 6. In the drawing, the new key 6 embodies the words "exploding mixture" and a block of red representing the color most suggestive of the exploding mixture, and in carrying out the color scheme in the film, it is desirable to employ colors which suggest the conditions of the fluid, whenever possible.

The portion of the film illustrated in Fig. 6 of the drawings, shows the exhausting operation of the engine and since the mixture has changed condition, in the cylinder, it now being exploded waste product, a different color, preferably purple, is employed to designate this condition of the fluid which has been employed for operating the engine. If it is desired, the coloring shown in the illustration may be graduated to show the different densities of the exploded waste product, in the cylinders, which graduation is slightly indicated by the variation in the spaces of the color indicating line in Fig. 6, and in machines or appliances where the variations in the density of the fluid employed, plays a considerable part in the operation of the machine or appliance, the said variation of the densities of the fluid may be shown by the graduation of the colors employed.

Figure 2:
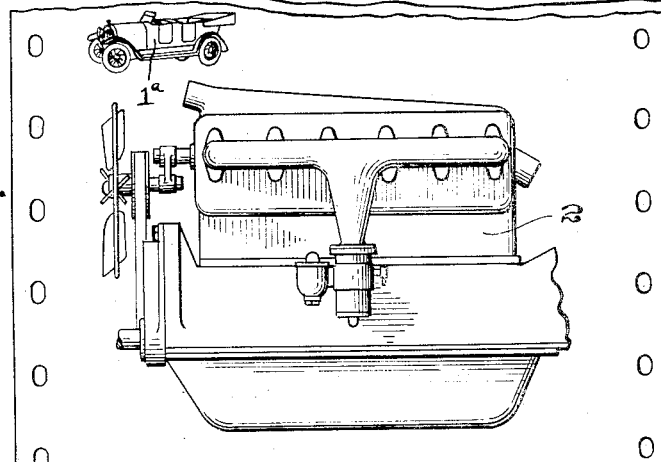

It will be noted, that the key 1^A which shows the complete automobile is carried in the upper left-hand corner of the film exhibited throughout the entire portion of the film exhibited subsequent to the initial portion which carries the view of the complete automobile in its normal visual portion, and also that the portion of the film which is exhibited subsequent to the portion illustrated in Fig. 2 which shows the complete engine of the automobile, carries a miniature reproduction of the said view of the motor in the upper right hand corner of the film throughout its entire length, which key or illustration is indicated by 2^A in the drawings and thus, should a person arrive after part of the film had been exhibited, he could, by means of the keys 1^A and 2^A instantly determine the fact that the film dealt with the operation of the engine or motor of an automobile. It will also be noticed, by reference to Figs. 5 and 6 of the drawings, and particularly to the latter figure that the key 6 which displays the indicia referring to the exploding mixture is not shown in this view, because the fluid employed is not in the said condition, during any portion of the exhausting operation of the engine, and consequently the said indicia is not necessary and by displaying the keys referring only to the colors appearing at the time being, the audience will not be confused with irrelevant colors or keys.

It is to be understood, that the Figs. 3, 4, 5 and 6 of the drawings, show the various parts of the engine only at one position during the various changes of the operation of the engine, but in the film, the illustration 3 should be made so as to show the continuous picture, or rather a series of animated pictures showing the complete operation of the engine.

If it is desired, suitable indicia, as indicated at 8 may be imprinted upon the film to distinquish the various distinctive phases in the operation of the engine.

While the invention may be utilized merely for educational purposes or amusement, it would also lend itself effectively for use as a means for advertising, for which latter purposes the pictures may be designed to emphasize advantageous and distinctive features of the device being displayed.

From the foregoing, it will be appreciated, that by means of the improved educational film, the construction and operation of various machines or appliances, such as airplane engines, submarines, or in fact any type of machinery could be effectively and comprehensively demonstrated to students or workmen, so as to enable them to quickly grasp an understanding of the complete construction and operation of the device.

I claim:

1. An educational device for depicting the various phases of an actuating medium for motors comprising a series of supports carrying pictures or images and displaying a color scheme to demonstrate the cause and effect of the actuating medium, the colors changing in subsequent pictures to depict the various phases and changes in the actuating medium.

2. An educational device for showing the various phases or changes in an actuating medium for machinery comprising a series of supports carrying pictures or images, the initial picture displaying a complete view of the machinery, and the subsequent pictures displaying various phases of the operation of the machinery represented in full by the initial picture, the subsequent pictures displaying a color scheme to demonstrate the cause and effect of the medium which brings about the various phases represented, the colors on the subsequent pictures changing to depict changes in such medium, said subsequently displayed pictures also displaying a key depicting in miniature the machinery as illustrated in the initially displayed picture.

3. An educational film for motion pictures, comprising a series of film sections depicting detailed workings of a device and embodying a color scheme to demonstrate the cause and effect of motive fluid and its condition, the colors on the film sections gradually changing to depict the changes in the motive fluid.

4. An educational film for motion pictures, comprising a series of film sections; the initially displayed film section depicting a complete device, and the subsequently displayed film sections depicting detailed workings of the device and embodying a color scheme to demonstrate the cause and effect of motive fluid and its condition, the colors on the film section gradually changing to depict changes in the motive fluid, said subsequently displayed sections also displaying a key depicting in miniature the device as depicted by the initially displayed section.

5. An educational film for motion pictures, comprising a series of film sections; the initially displayed film section depicting a complete device, and the subsequently displayed film sections depicting detailed workings of the device and embodying a color scheme to demonstrate the cause and effect of motive fluid and its condition, the colors on the film section gradually changing to depict changes in the motive fluid, said subsequently displayed sections also displaying a key depicting in miniature the device as depicted by the initially displayed section, said subsequently displayed film sections further displaying a key to the meaning of the colors displayed, said latter key including indicia referring only to the colors used on the film section displayed therewith.

FREDRICK A. AYRES.